(12) United States Patent
Nakamura et al.

(10) Patent No.: US 6,390,250 B1
(45) Date of Patent: May 21, 2002

(54) ROTARY FRICTION MEMBER, AND PROCESS FOR PRODUCING THE SAME

(75) Inventors: Koji Nakamura; Katsuhiro Kitamura; Katsuhiro Shibata, all of Wako; Yasuhiro Nakao, Sayama, all of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/500,815

(22) Filed: Feb. 10, 2000

(30) Foreign Application Priority Data

Feb. 12, 1999 (JP) .......................................... 11-034663

(51) Int. Cl.[7] .............................................. F16D 65/10
(52) U.S. Cl. ................................................ 188/218 XL
(58) Field of Search ...................... 188/218 R, 218 XL, 188/70 R, 18 A, 264 A, 264 AA, 251 A, 251 M; 428/831, 539.5; 264/40.1

(56) References Cited

U.S. PATENT DOCUMENTS 5,544,726 A * 8/1996 Topouzian et al. ..... 188/218 XL
5,620,791 A * 4/1997 Dwivedi et al. ....... 188/251 M
5,765,667 A * 6/1998 Ross et al. ............ 188/218 XL
5,980,792 A * 11/1999 Chamlee ................ 264/40.1
6,180,258 B1 * 1/2001 Klier ...................... 328/539.5

FOREIGN PATENT DOCUMENTS

JP          5106666      * 4/1993     ............. 188/218 R

* cited by examiner

*Primary Examiner*—Pam Rodriguez
*Assistant Examiner*—Melanie Torres
(74) *Attorney, Agent, or Firm*—Arent Fox Kintner Plotkin & Kahn, PLLC

(57) ABSTRACT

The present invention ensures that the warping of an annular disk body of a brake disk, in the direction of a rotational axis, due to a friction heat, is inhibited to a large extent. The brake disk includes an aluminum alloy matrix, a plurality of alumina aggregates dispersed in the matrix, and a plurality of fine alumina grains. The alumina aggregates have an aspect ratio A larger than 1. In an annular disk body, the alumina aggregates are oriented with their lengthwise directions aligned with the radial direction of the disk body.

4 Claims, 6 Drawing Sheets

ROTARY FRICTION MEMBER, AND PROCESS FOR PRODUCING THE SAME

BACKGROUND OF THE INVENTION

1. Field of the Invention

The present invention relates to a rotary friction member, and more particularly to a rotary friction member having a friction area surrounding a rotational axis, and a process for producing the same. This type of the rotary friction member corresponds to a brake disk, a brake drum, a clutch plate or the like.

2. Description of the Prior Art

There is a conventionally known brake disk which is formed of an aluminum alloy composite material due to the demand for a reduction in weight.

However, if a vehicle including the brake disk formed as described above is braked severely, for example, at high deceleration from a high speed, an annular disk body (the friction area) which is in friction contact with a friction pad, may be warped in the direction of the rotational axis due to the friction heat, and this warping may be left as a permanent strain, in some cases. As a result, disadvantages arise such as a reduction in brake effectiveness, uneven wear of the friction pad and the like.

SUMMARY OF THE INVENTION

It is an object of the present invention to provide a rotary friction member of the above-described type, wherein the warping in the rotational direction due to the friction heat of the annular area extending in a diametrical direction around the rotational axis such as the disk body of the brake disk, can be inhibited to a large extent.

To achieve the above object, according to the present invention, there is provided a rotary friction member having a friction area surrounding a rotational axis, the rotary friction member comprising a metal matrix, a large number of ceramic grain aggregates dispersed in the metal matrix and a large number of fine ceramic grains, the aggregates having an aspect ratio A larger than 1. The ceramic grain aggregates are oriented with their lengthwise directions aligned in a radial direction in the annular area which extends in the diametric direction around the rotational axis. Warping of the friction member in the direction of the rotational axis due to friction heat, is inhibited.

With the above arrangement, the annular area is reinforced by the orientation of the large number of fine ceramic grain aggregates in such a manner that a large number of metal reinforcements are embedded in the radial direction. In addition, the annular area is reinforced over the entire region by the large number of fine ceramic grains dispersed in the entire region. Therefore, the warping of the annular area in the direction of the rotational axis due to the friction heat, can be inhibited to a large extent.

It is another object of the present invention to provide a producing process of the above-described type, whereby a rotary friction member having the above-described arrangement can be mass-produced.

To achieve this object, there is provided a process for producing a rotary friction member which has a friction area surrounding the rotational axis. The friction member comprises a metal matrix, a large number of ceramic grain aggregates dispersed in the metal matrix, and a large number of fine ceramic grains, the aggregates having an aspect ratio A larger than 1. The ceramic grain aggregates are oriented with their lengthwise directions aligned in the radial direction in the annular area which extends in the diametrical direction around the rotational axis. Warping of the rotary friction member in the direction of the rotational axis due to friction heat is inhibited. The process comprises the steps of extruding a blank material comprising a metal matrix, and a large number of ceramic grain aggregates which are fine, dispersed in the metal matrix and which have a substantially spherical shape, thereby forming an extruded material including the large number of ceramic grain aggregates having an aspect ratio A larger than 1, and a large number of fine ceramic grains. The extruded material is heated to prepare a casting material wherein the metal matrix is molten, and the casting material is poured into a cavity in a pressure casting apparatus, so that the casting material is allowed to flow in the radial direction from the inner periphery in the annular area forming region of the cavity.

If the blank material is extruded, the large number of fine ceramic grain aggregates are stretched in the extruding direction to have an aspect ratio A larger than 1. Some of the ceramic grain aggregates are disintegrated by the extrusion, thereby producing a large number of fine ceramic grains.

The casting material assumes a pseudo semi-molten state wherein the metal matrix is of a liquid phase, and the fine ceramic grain aggregates and the fine ceramic grains are of solid phases, but their shapes are maintained.

If such casting material is allowed to flow in the radial direction from the inner periphery in the annular area forming region of the cavity, the large number of ceramic grain aggregates are oriented with their lengthwise directions aligned with the radial direction which is the flowing direction during the flow of the casting material.

DETAILED DESCRIPTION OF THE PREFERRED EMBODIMENT

Figure 1:
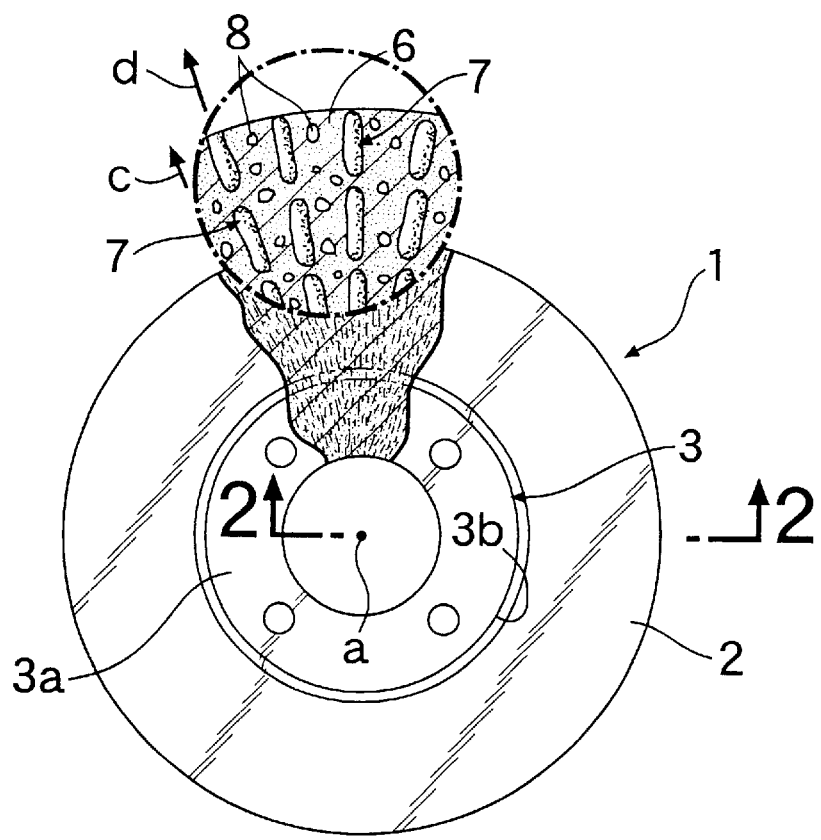
FIG. 1 is a partially expanded view of an essential portion of a brake disk according to an embodiment of the present invention.
Figure 2:
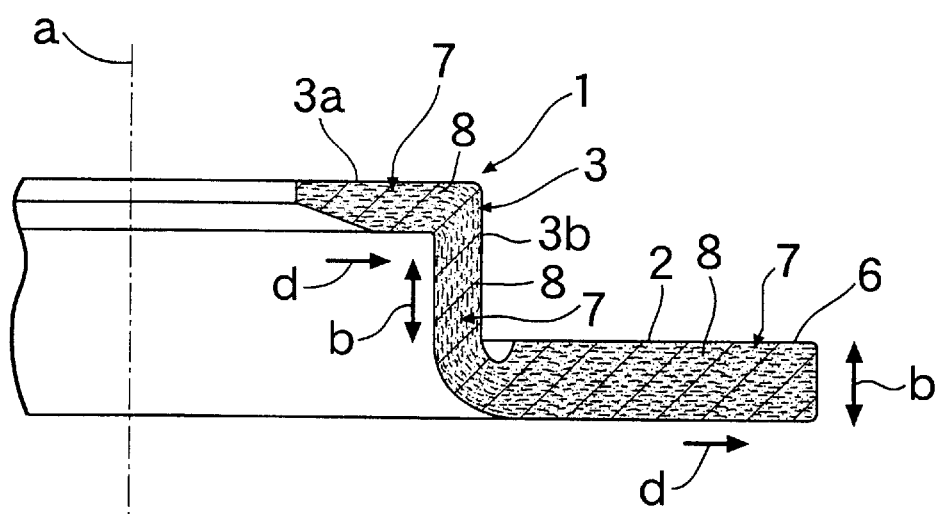
FIG. 2 is an enlarged sectional view taken along a line 2—2 in FIG. 1.

Referring to FIGS. 1 and 2, a brake disk 1 which functions as a rotary friction member, comprises an annular disk body 2 having a large-diameter annular plate-shape which is brought into friction contact with a friction pad functioning as a friction area surrounding a rotational axis a, and an attachment section 3 located around an inner periphery of the annular disk body 2, the attachment section 3 being mounted to a wheel hub. The attachment section 3 is comprised of an annular central portion 3a having a small-diameter annular plate-shape and a plurality of bolt-insertion bores 4, and a short cylindrical portion 3b which connects the inner peripheral edge of the annular disk body 2 and an outer peripheral edge of the annular central portion 3a to each other.

The brake disk 1 comprises a metal matrix 6, a large number of ceramic grain aggregates 7 dispersed in the metal matrix 6 and fine ceramic grains 8. The aggregates 7 have an aspect ratio A larger than 1. The annular disk body 2 which is an annular area, extends in a diametric direction about the rotational axis a. The warping of the disk body in the direction b of the rotational axis due to a friction heat, will be inhibited. The ceramic grain aggregates 7 are oriented with their lengthwise directions c aligned with the radial direction d.

If the brake disk 1 is constructed in the above manner, the annular disk body 2 is reinforced by the orientation of the large number of fine ceramic grain aggregates 7 such that a large number of metal reinforcements are embedded in the radial direction d. The annular disk body 2 is also reinforced by the large number of fine ceramic grains 8 dispersed in the entire region of the body 2. Therefore, the warping due to the friction heat of the brake disk body 2 in the direction b of the rotational axis, namely toward the attachment section 3, as shown by a dashed line in FIG. 3, can be inhibited to a large extent.

In the annular central portion 3a of the attachment section 3, the ceramic grain aggregates 7 are oriented with their lengthwise directions aligned with the radial direction d, and in the short cylindrical portion 3b, the ceramic grain aggregates 7 are oriented with their lengthwise directions aligned with the direction b of the rotational axis.

The metal matrix 6 is formed of an aluminum alloy, a magnesium alloy or the like. The ceramic grain aggregates 7 correspond to alumina agglomerates, alumina granulates or the like having an average diameter of 20 to 100 $\mu$m. The alumina agglomerates are necessarily produced in the course of production of alumina from bauxite, and are relatively spherical agglomerates comprising a large number of fine alumina grains and are inexpensive as compared with reinforcing grains such as alumina grains, silicon carbide grains and the like, and a reinforcing fiber such as a alumina fiber, a silica fiber and the like. The alumina granulates are formed into a granular shape by granulating a large number of fine alumina grains with a binder such as a resin.

Figure 4:
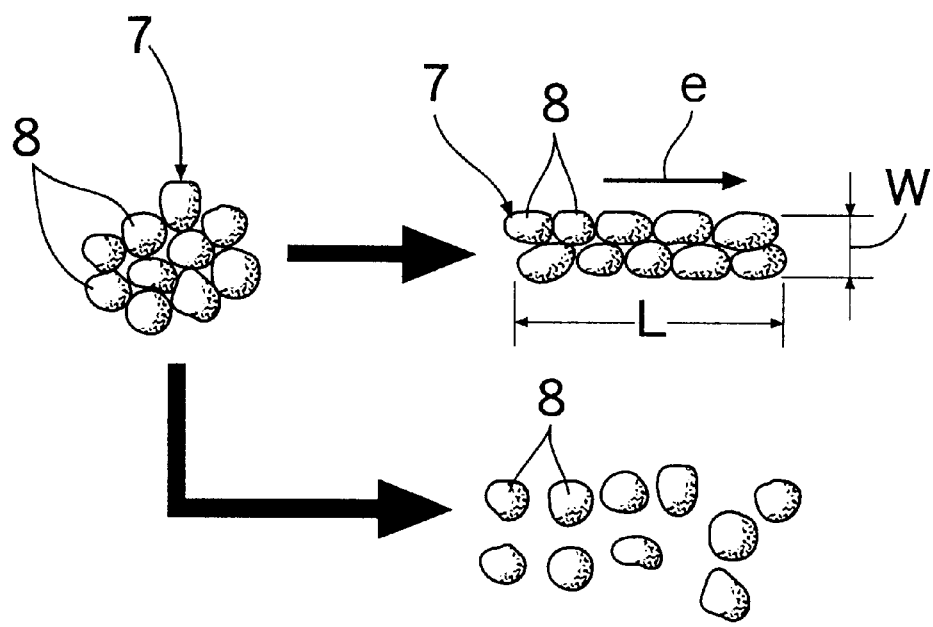
FIG. 4 is a diagram for explaining the change of the form of a ceramic grain aggregate by an extrusion.

As shown in FIG. 4, the alumina agglomerates 7 are initially substantially spherical, but have an aspect ratio A equal to L/W>1 as a result of stretching of the alumina agglomerates in the extruding direction e in an extruding step for producing an extruded material which is the casting material for the brake disk 1. In this case, it is desirable that the aspect ratio A is equal to or larger than 2 (A$\geq$2) in order to reliably inhibit the warping of the annular disk body 2. The fine ceramic grains 8 are those produced by disintegration of the ceramic grain aggregates 7 in the extruding step, e.g., fine alumina grains.

In the metal matrix 6, the volume fraction Vf of a dispersion comprising ceramic grain aggregates 7 and the fine ceramic grains 8 is set in a range of 5%$\leq$Vf$\leq$50%. However, if Vf<5%, the wear resistance of the rotary friction member, e.g., the brake disk 1 is reduced, and a sufficient dispersion reinforcing ability is not obtained. On the other hand, if Vf>50%, the machinability of the rotary friction member, e.g., the brake disk 1, is reduced.

A particular example will be described below.

First, a brake disk 1 was made in the following manner:

(a) An aluminum alloy (A6061) and substantially spherical alumina aggregates 7 having an average diameter of 50 $\mu$m and a volume fraction Vf of 20% were thrown into a melting furnace, thereby producing a blank material comprising an aluminum alloy matrix 6 and a large number of alumina aggregates 7 which were fine, dispersed in the matrix 6 and have a substantially spherical shape.

(b) The blank material was subjected to induction-heating up to 570° C. and then inserted into a container. The container having the blank material inserted therein, was placed in an extruding machine and then subjected to extrusion under conditions of an extrusion ratio of 7.2 and a stem speed of 3 m/min to produce an extrudate.

During this extrusion, a large number of fine alumina aggregates 7 were stretched in the extruding direction e to have an aspect ratio A nearly equal to 2.2 (A$\cong$2.2). Some of the alumina aggregates 7 are disintegrated by the extrusion to produce a large number of fine alumina grains 8.

(c) The extrudate cut into a predetermined length, was induction-heated up to 645° C. to prepare a casting material having a molten aluminum metal matrix 6.

Figure 5:
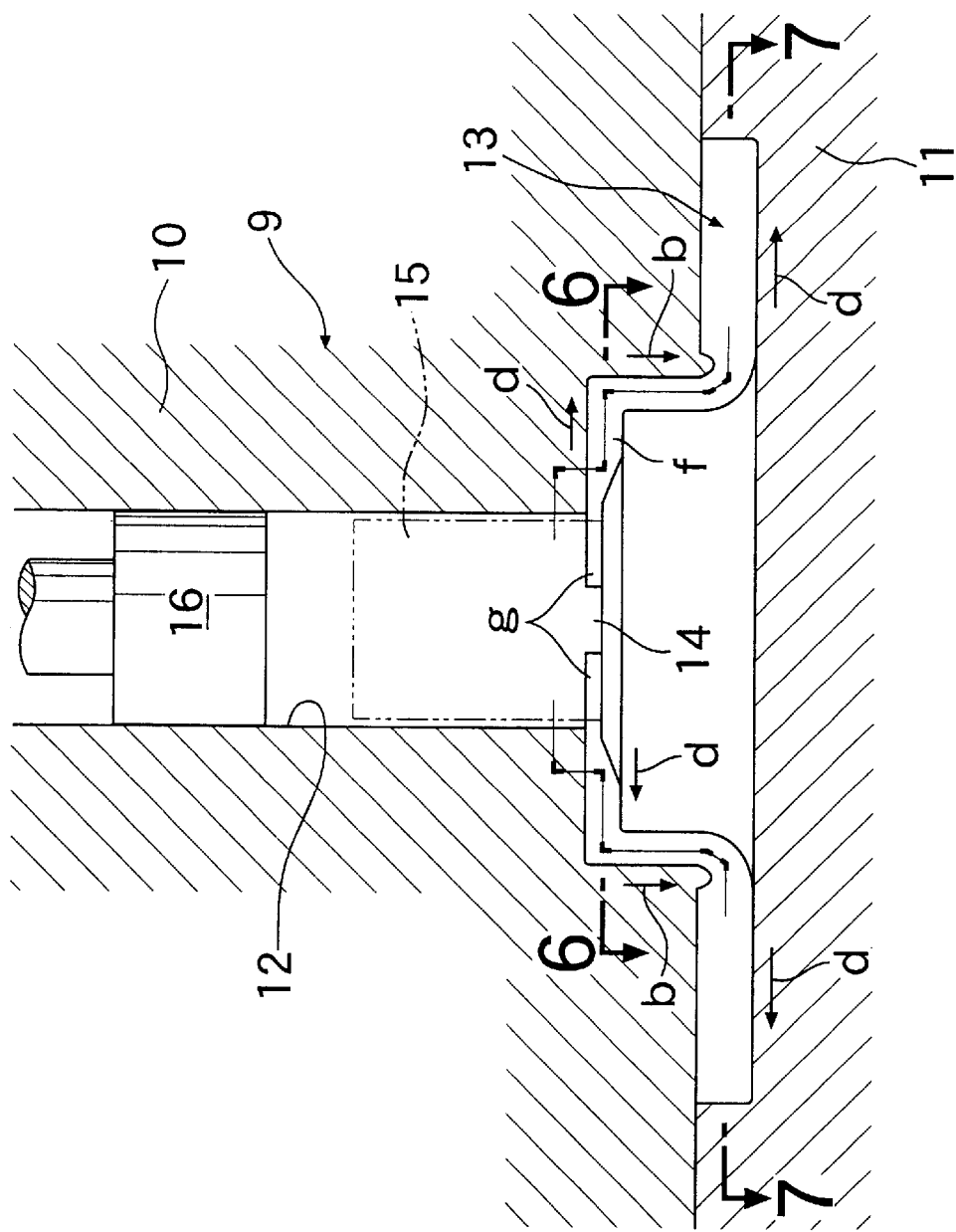
FIG. 5 is a sectional view of a pressure casting apparatus.
Figure 6:
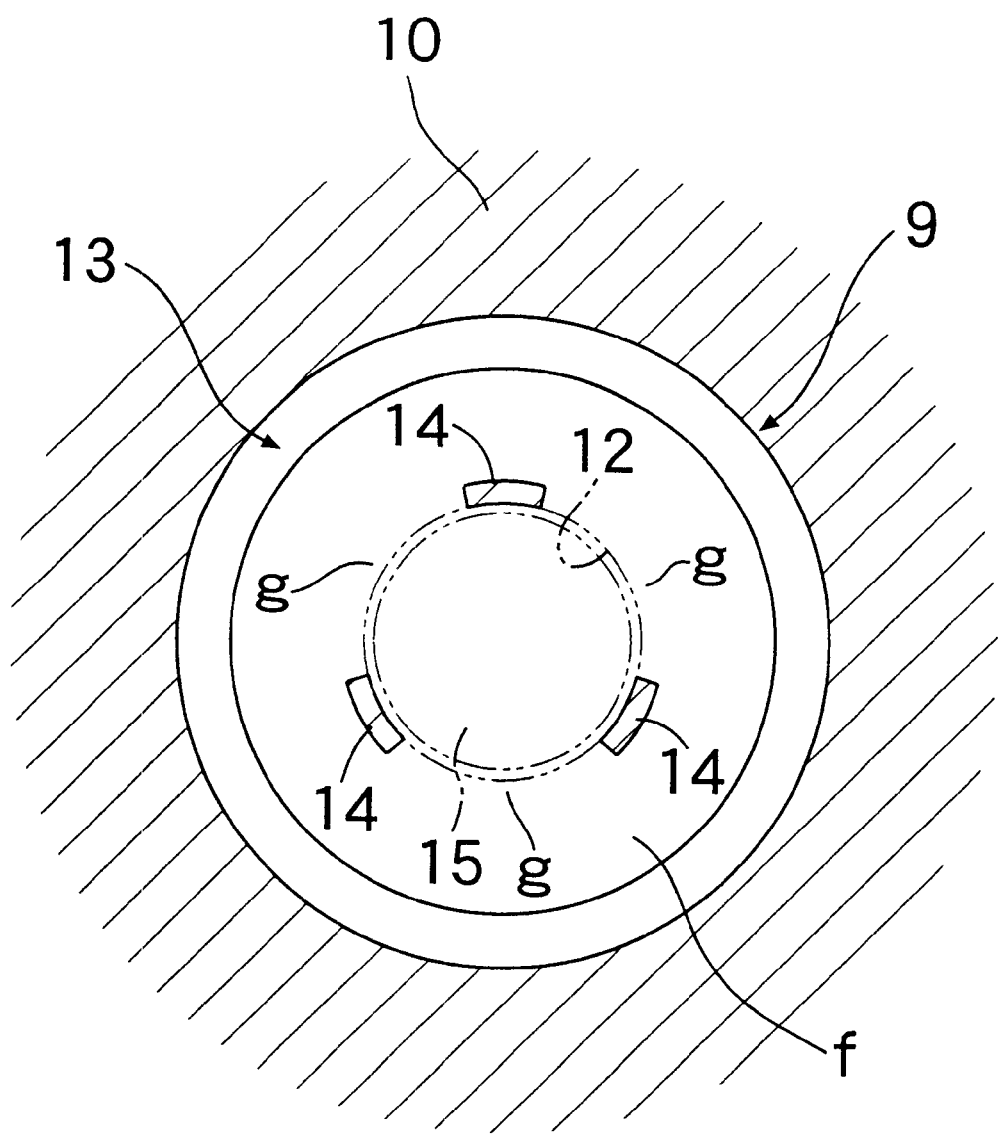
FIG. 6 is a sectional view taken along a line 6—6 in FIG. 5.

(d) As shown in FIGS. 5 and 6, a pressure-casting apparatus 9 includes an upper die block 10 and a lower die block 11. A cylinder bore 12 defined in the upper die block 10 communicates with an annular attachment portion forming region f in a brake disk forming cavity 13 defined by the upper and lower die blocks 10 and 11 through three gates g partitioned by three projections 14 on the lower surface of the upper die block 10. The casting material 15 was placed into the cylinder bore 12 and then, a plunger 16 was lowered to charge the casting material 15 into the cavity 13 through the gates g. Thereafter, a pressing force was applied to the casting material 15 in the cavity 13. In this case, the speed of the plunger 16 was controlled between a high speed of 1 m/sec and a low speed of 0.7 m/sec, and the pressing force was set at 80 MPa.

Figure 7:
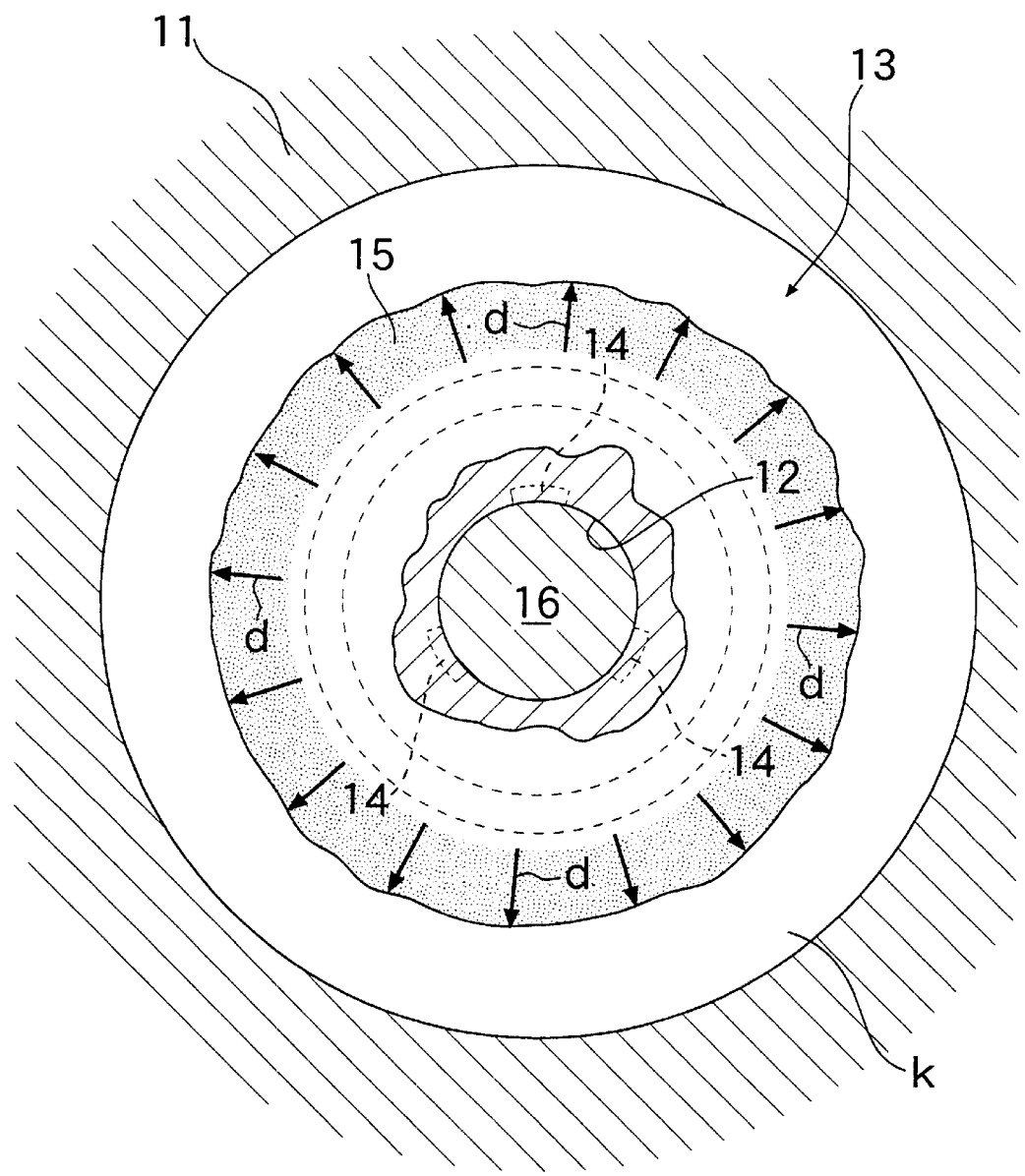
FIG. 7 is a sectional view taken along a line 7—7 in FIG. 5 for explaining the flow of a casting material.

The casting material 15 flowed in the radial direction d in the annular central portion forming region f of the cavity 13, and then flowed in the direction 2 of the rotational axis in a short cylindrical portion forming region h. Thereafter, the casting material 15 flowed in the radial direction d from the inner periphery in an annular disk body forming region (annular area forming region) k, as also shown in FIG. 7.

In the casting step, the casting material 15 assumed a pseudo semi-molten state in which the aluminum alloy matrix 6 was of a liquid phase and the fine alumina aggregates 7 and the fine alumina grains 8 were of solid phases, but their shapes were maintained. Such casting material 15 was allowed to flow in the radial direction d from the inner periphery in the annular disk body forming region k of the cavity 13, and the large number of alumina aggregates 7 were oriented with their lengthwise directions c aligned with the radial direction d during flowing of the casting material 15.

The volume fraction Vf of the dispersion in the brake disk 1 produced in the above manner was 20% which is the same as that of the blank material. This brake disk 1 is called a first example according to the present invention.

For comparison, a brake disk having substantially spherical alumina aggregates dispersed therein was produced in the same manner as that described above, except that the extruding step was not conducted. This brake disk is called a comparative example.

Figure 3:
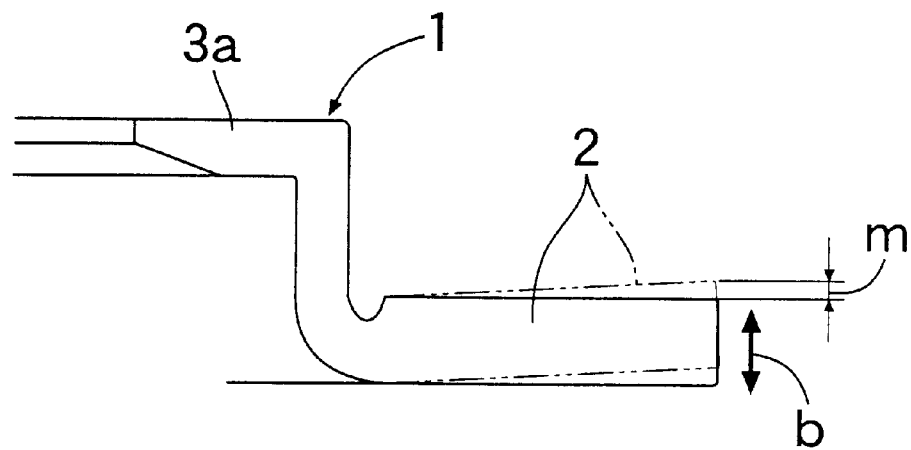
FIG. 3 is a diagram similar to FIG. 2, but for explaining the warping of an annular disk body.

The brake disks in the first example according to the present invention and the comparative example were subjected to a bench brake test and then, the warped amount m of the annular disk brake bodies 2 in the first example and the comparative example were measured. The test conditions were as follows: The speed was set at 220 km/hr→0 km/hr; the deceleration was set at 0.7 G; the inertia was set at 15 kg·m$^2$; and the braking frequency was set at 50 times. The warped amount m was determined as a deformed amount in the direction h of the rotational axis at a tip end of the annular disk body 2, namely, toward the annular attachment portion 4 as shown in FIG. 3.

Tensile test pieces long in the radial direction d was made from the annular disk bodies 2 in both of the first example according to the present invention and the comparative example, and pulled in a lengthwise direction, whereby their tensile strength was measured.

Table 1 shows results of both the tests for both the examples.

TABLE 1

|  | Warped amount m (mm) | Tensile Strength (MPa) |
| --- | --- | --- |
| First Example | 0.2 | 250 |
| Comparative Example | 1.0 | 175 |

As is apparent from Table 1, it was ascertained that the warped amount m in the first example is one fifth of that in the comparative example, and the strength in the example is about 1.4 times that in the comparative example. Such differences are attributable to the differences between the shapes and orientations of the alumina aggregates 7 and to the occurrence or non-occurrence of the dispersion of the fine alumina grains 8.

Figure 8:
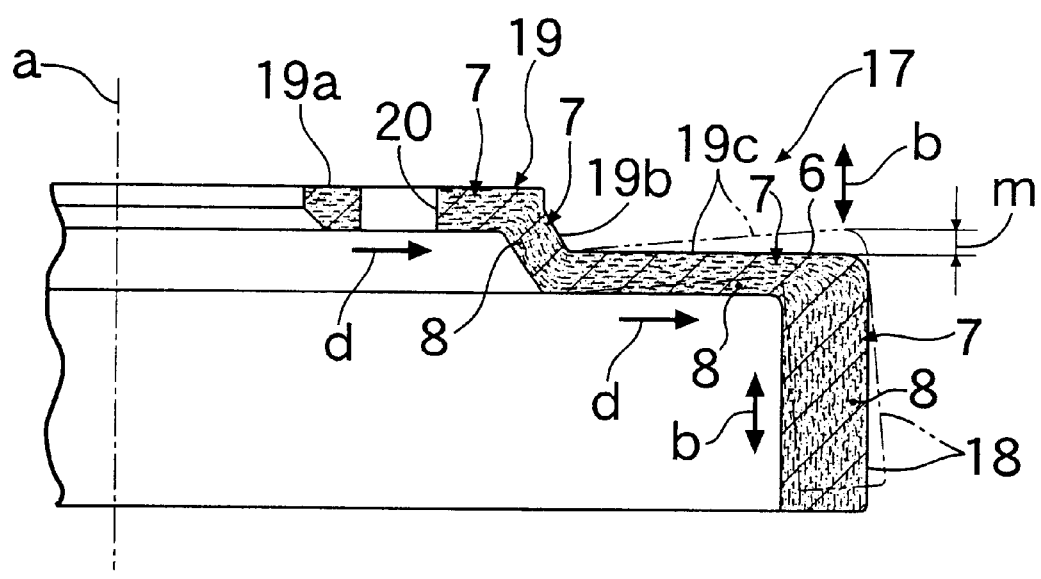
FIG. 8 is a sectional view of a brake drum, similar to FIG. 2.

FIG. 8 shows a brake drum 17 as a rotary friction member. The brake drum 17 comprises a drum body 18 having a cylindrical shape, for placement in friction contact with a lining as a friction area surrounding the rotational axis a, and an attachment section 19 located around an inner periphery at one end of the drum body 18 and mounted to a wheel hub. The attachment section 19 is comprised of an annular central portion 19a assuming a small-diameter annular plate shape and having a plurality of bolt insertion bores 20, a short tapered cylindrical portion 19b having a small-diameter end connected to an outer peripheral edge of the annular central portion 19a, and an annular outer peripheral portion 19c assuming a large-diameter annular plate shape and connecting an annular end of the drum body 18 and a large-diameter end of the tapered cylindrical portion 19b.

The material for the brake drum 17 is the same as that for the above-described brake disk 1, and the casting process for the brake drum 17 is substantially the same as that for the brake disk 1. Therefore, in an annular area which extends in the diametric direction around the rotational axis and whose warping in the direction b of the rotational axis due to a friction heat, namely, toward the annular central portion 19a will be inhibited. In the annular outer peripheral portion 19c, the alumina aggregates 7 are oriented with their lengthwise directions aligned with the radial direction d, as in the annular disk body 2.

In the annular central portion 19a, the alumina aggregates 7 are oriented with their lengthwise directions aligned with the radial direction d. In the tapered cylindrical portion 19b, the alumina aggregates 7 are oriented with their lengthwise directions aligned with the tapered angle. Further, in the drum body 18, the alumina aggregates 7 are oriented with their lengthwise directions aligned with the direction h of the rotational axis.

In the drum body 18, if the alumina aggregates 7 are oriented as described above, the spreading of an opening due to a friction heat as shown by a dashed line in FIG. 8 can be inhibited to a large extent.

According to the present invention, a rotary friction member is formed so that the warping of the annular area in the direction of the rotational axis around the rotational axis due to the friction heat, can be inhibited to a large extent by the above-described arrangement.

In addition, according to the present invention, it is possible to provide a producing process whereby a rotary friction member as described above can be mass-produced by employing the above-described means.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

We claim:

1. A rotary friction member having a friction area surrounding a rotational axis thereof, said rotary friction member comprising a metal matrix, a plurality of ceramic grain aggregates dispersed in said metal matrix, and a plurality of fine ceramic grains, wherein said aggregates have an aspect ratio A larger than 1, and said ceramic grain aggregates are oriented in a pattern with the length thereof directed radially in the annular area that extends diametrically around the rotational axis of said rotary friction member, whereby warping in the direction of the rotational axis due to a friction heat is inhibited.

2. A rotary friction member according to claim 1, wherein said rotary friction member is a brake disk, and said annular area is the annular disk body thereof for friction contact with a friction pad.

3. A rotary friction member according to claim 1, wherein said rotary friction member is a brake drum having a cylindrical drum body and an annular outer peripheral portion of an attachment section mounted to a wheel hub, wherein said annular area is said annular outer peripheral portion, and is connected to said cylindrical drum body.

4. A process for producing a rotary friction member having a friction area surrounding the rotational axis thereof, the rotary friction member including a metal matrix, a plurality of ceramic grain aggregates dispersed in said metal matrix, and a plurality of fine ceramic grains, said ceramic grain aggregates having an aspect ration A larger than 1, and said ceramic grain aggregates being oriented in a pattern with the length thereof directed radially in said annular area that extends diametrically around the rotational axis thereof whereby warping thereof in the direction of the rotational axis, due to a friction heat, is inhibited, said process comprising the steps of extruding a blank material comprising a metal matrix and a plurality of spherical shaped ceramic grain aggregates dispersed in said metal matrix thereby producing an extruded material including the plurality of ceramic grain aggregates having an aspect ratio A larger than 1, and a plurality of fine ceramic grains, heating said extruded material to prepare a casting material having said metal matrix molten, pouring said casting material into a cavity in a pressure casting apparatus such that said casting material flows radially from an inner periphery of an annular area forming region of said cavity.

* * * * *